Nov. 23, 1965  T. J. POWERS III  3,219,577
BIOLOGICAL OXIDATION
Filed Sept. 26, 1963  2 Sheets-Sheet 2
   
Fig. 3  Fig. 5  Fig. 7  Fig. 9
 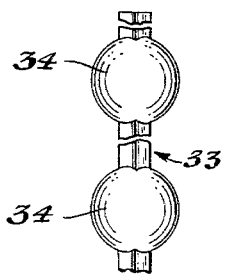 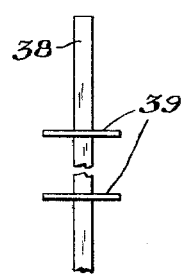 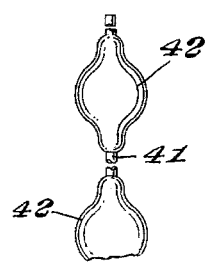
Fig. 2  Fig. 4  Fig. 6  Fig. 8
   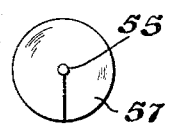
Fig. 11  Fig. 13  Fig. 15  Fig. 17
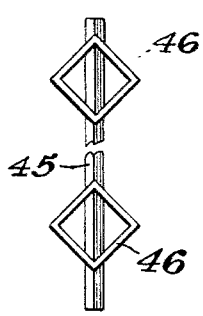 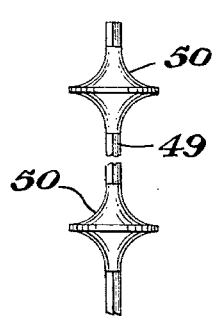 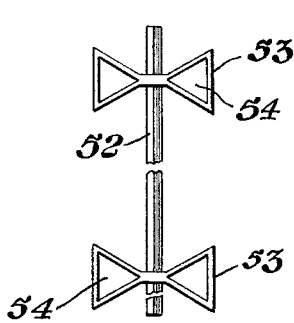 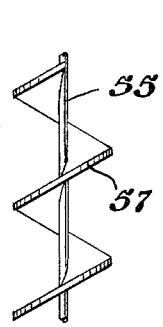
Fig. 10  Fig. 12  Fig. 14  Fig. 16
INVENTOR.
Thomas J. Powers III
BY
Robert B. Ingraham
AGENT United States Patent Office 3,219,577
Patented Nov. 23, 1965

3,219,577
BIOLOGICAL OXIDATION
Thomas J. Powers III, Broomall, Pa., assignor to The Dow Chemical Company, Midland, Mich., a corporation of Delaware
Filed Sept. 26, 1963, Ser. No. 311,907
5 Claims. (Cl. 210—17)

This invention relates to a method of carrying out biological oxidation and an improved apparatus therefor. It more particularly relates to the use of strandular members as a biological oxidation medium.

A wide variety of shapes and forms are utilized in the liquid gas contact art wherein a biological slime is permitted to grow on a surface and the action of the bacteria forming the slime removes undesired organic materials from the aqueous material passing thereover. Typical of such constructions is the rock filter wherein rocks or stones are positioned in a tank or bed and are sprayed with the aqueous material to be purified. Such trickling filters or biological oxidation beds require a relatively large volume for the surface area of exposed slime they present to the air. Further, on occasions when such installations must be cleaned or replaced, it entails a considerable amount of difficulty and labor. Various sheet constructions, particularly those utilizing bundles of corrugated sheets secured together, have also been utilized for biological oxidation purposes. However, they suffer from the difficulty that under varying slime levels the exposed surfaces tend to decrease sharply as the slime layer increases in thickness, thus frequently rendering the unit inoperative or at least partially inoperative when an overload occurs. Oftentimes sluffing of the slime from the support will tend to plug and result in flooding.

It is an object of this invention to provide an improved method for the distribution of liquid during biological oxidation.

Another object of the invention is to provide a biological oxidation unit which will increase in exposed surface area as the slime increases.

Another object of this invention is to provide a biological oxidation structure that is readily and easily cleaned and means by which the surface can be readily varied dependent upon the anticipated load.

These features and other advantages in accordance with the present invention are readily achieved by utilizing as a biological oxidation medium a plurality of dependent filaments in generally parallel relationship and distributing over these filaments the aqueous material to be treated at a rate suitable for the biological oxidation of the organic materials contained therein. Also contemplated within the scope of the invention are a plurality of filaments having desirable shapes for such a biological oxidation reaction and a biological oxidation apparatus utilizing the filamentary articles.

Further features and advantages of the present invention will become more apparent from the following specification taken in connection with the drawing wherein:

FIGURE 1 schematically illustrates a biological oxidation device in accordance with the invention;

FIGURE 2 illustrates a side view of a filament suitable for the practice of the invention;

FIGURE 3 is a cross sectional view of the filament of FIGURE 2;

FIGURE 4 illustrates a side view of an alternate embodiment of a filament;

FIGURE 5 depicts a cross section of the filament of FIGURE 4;

FIGURE 6 depicts a side view of a filament;

FIGURE 7 depicts a cross section of the filament of FIGURE 6;

FIGURE 8 depicts a side view of a filament;

FIGURE 9 depicts a cross section of a filament of FIGURE 8;

FIGURE 10 depicts a side view of a filament;

FIGURE 11 depicts a cross section of the filament of FIGURE 10;

FIGURE 12 depicts a side view of a filament;

FIGURE 13 depicts a cross section of the filament of FIGURE 12;

FIGURE 14 depicts a side view of a filament;

FIGURE 15 depicts a cross section of the filament of FIGURE 14;

FIGURE 16 depicts a side view of a filament;

FIGURE 17 depicts a cross section of the filament of FIGURE 16.

Figure 1:
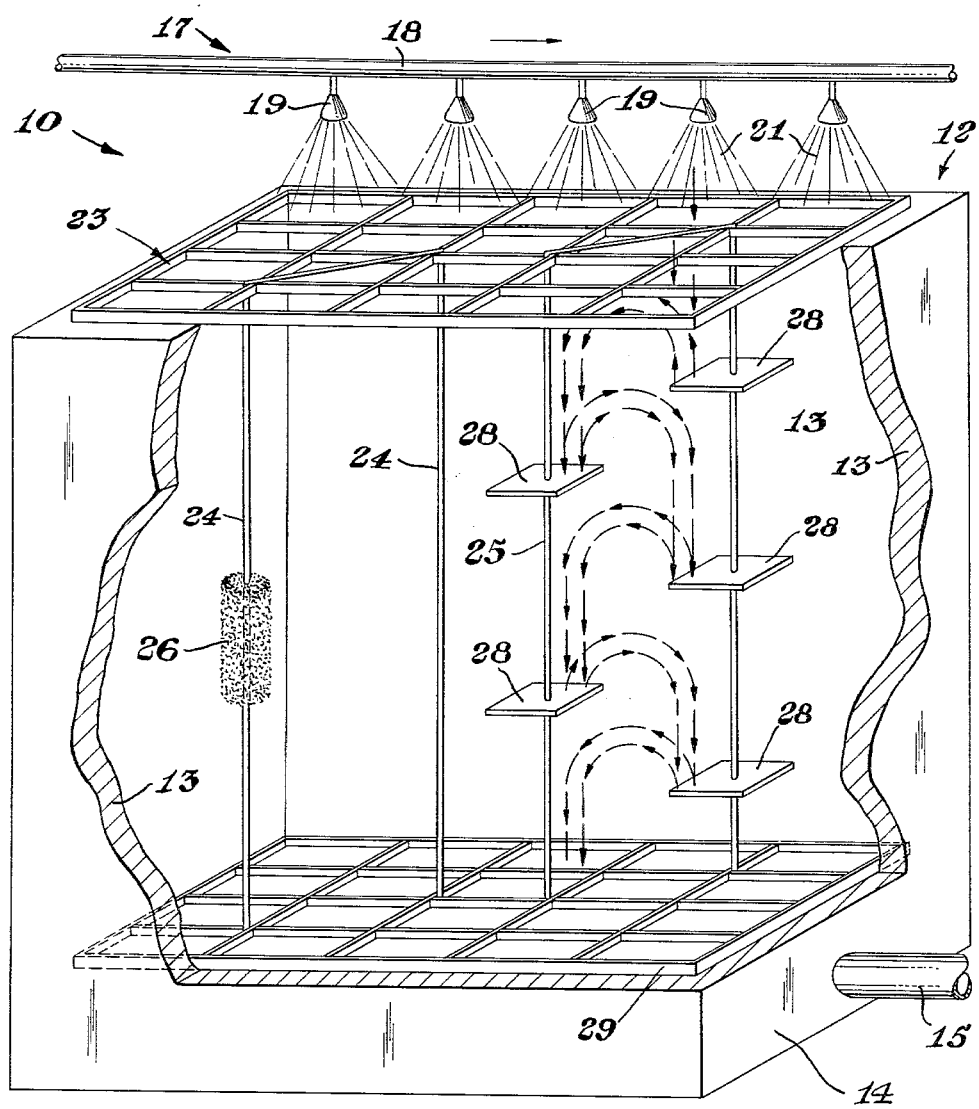

In FIGURE 1, there is illustrated a cutaway schematic representation of a biological oxidation apparatus in accordance with the invention generally designated by the reference numeral 10. The apparatus 10 comprises an enclosure 12 having vertical walls 13, bottom 14, the bottom 14 being provided with a discharge or drain 15, a liquid distributor system 17 is positioned remote from the bottom 15, the distributor 17 comprises a conduit 18 having a plurality of liquid outlets 19. A liquid spray 21 is discharged from the liquid outlets 19. Positioned below the outlets 19 and receiving the spray 21 is a support frame 23. A plurality of filamentary articles 24 and 25 depend from the frame 23. Shown on a portion of the filamentary article 24 is a biological growth media 26. Supported by the filamentary article 25 are a plurality of protrusions 28. The filamentary articles 24 and 25 are secured to a base or bottom frame 29. The dotted lines with arrows depict the course of flow of liquid over the deflectors 28 and the filamentary article 25.

In FIGURES 2 and 3 there is illustrated a filamentary article 31 suitable for use in a biological oxidation assembly, such as is schematically represented in FIGURE 1. The enlarged cross sectional view of FIGURE 3 illustrates the shaping of the filament in order to provide a large surface area to which the slimes may attach themselves.

An alternate embodiment of a filamentary article 33 is illustrated in FIGURES 4 and 5 wherein generally spherical protrusions 34 are provided in spaced relationship along the filament in order to provide increased support for a slime layer.

FIGURES 6 and 7 depict a filament 38 having a plurality of deflector plates 39 adjacent thereto and maintained in spaced relationship from each other.

FIGURES 8 and 9 illustrate a filamentary article 41 having adjacent thereto a plurality of generally bulbous protuberances 42. The protuberances 42 provide added support for slime which adheres to the filamentary article.

FIGURES 10 and 11 illustrate a filamentary article 45 having adjacent thereto a plurality of generally bulbous protuberances 46. The protuberances 46 provide added support for slime which adheres to the filamentary article. The configuration for the protuberances 46 is such that they are readily adapted to support relatively large quantities of slime and are specifically advantageous in applications where relatively thick growths are anticipated.

A somewhat similar arrangement is illustrated in FIGURES 12 and 13 wherein a filamentary article 49 is provided with a plurality of protuberances 50. The protuberances 50 act not only as a support for a heavy growth of slime but also serve to function as a separator to prevent any possible growing together of the slime coatings on the filamentary article.

FIGURES 14 and 15 depict an alternate arrangement of a filamentary article 52 and plurality of protuberances 53. The protuberances 53 provide a rigid support for the slime 53 and an opportunity to grow through openings 54 and within the protuberances 53.

The embodiment of FIGURES 16 and 17 wherein a central filamentary article 55 is provided with a generally helical flight 57 offers the unique advantage of providing a relatively long path for the distending liquid and is used in applications where the depth of the tower or structure is limited.

Generally, in preparing an installation in accordance with the present invention, it is desirable to use as high an enclosure as is practical under the circumstances. However, enclosures varying in height from about 3 feet to about 40 feet are readily utilized. Such enclosures are provided with means to support the filament supporting the framework. The framework must be sufficiently strong to support combined load of the filaments and the slime growth. Various methods are readily employed for suspending the filaments from the supporting frame. One particularly beneficial and advantageous method is to utilize a filament having a length approximately twice that of the desired height of the structure and suspending it by its center from the framework. This is easily accomplished by draping the filament over a support bar which beneficially may be provided with depressions on the upper surface to maintain the desired spacing. Oftentimes, in order to provide improved distribution of the sprayed liquid onto the supporting medium onto the filaments some of the filaments are looped in such a manner that they are effectively draped over the support members, such as is illustrated in FIGURE 1, wherein the filament 25 is passed over at least two different frame members thus providing a deflector for the spray and eliminating appreciable free fall of the liquid through the tower without contacting the slime or media. For relatively short structures, filaments having deflectors, such as are illustrated in FIGURES 6, 12 and 16, are particularly advantageous as these are readily arranged with adjacent deflectors at varying levels and provide a relatively torturous path from top to bottom. Particularly advantageous is the embodiment of FIGURES 16 and 17 wherein a spiral flight is provided about a filamentary disposed supporting filament. The spiral flight provides a relatively long path of travel for a liquid flowing from the upper end of the filament to the lower end. Beneficially, a wide variety of materials may be utilized where the construction of vapor liquid contact medium in accordance with the present invention, preferably for biological oxidation purposes, non-corrodible materials, such as plastics are utilized. Complex shapes for the filaments are readily generated by extrusion into almost any desired configuration. Protuberances, deflection plates and the like are easily formed by molding and affixed to the filament by adhesives, mechanical locking, heat sealing, and the like. Some of the suitable plastic materials include polyvinyl chloride, copolymers of vinyl and vinylidene chloride, polystyrene, polytetrafluoroethylene, and the like.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the operation of a gas-liquid contact apparatus for the biological oxidation of organic waste materials wherein water containing waste materials is distributed over a support medium which has on its surfaces a biological growth capable of oxidizing the undesired organic waste materials within the water in the presence of air, the improvement which comprises disposing as the support medium a plurality of vertical, spaced apart, parallel, laterally unsupported filaments and disposing said biological growth on each of the filaments of the support medium in a generally filamentary configuration wherein a plurality of generally vertically disposed, spaced apart, parallel, laterally unsupported, and internally supported filaments of said biological growth are provided.

2. The method of claim 1 including the step of providing the waste water to the filamentary biological growth by means of a spray.

3. The method of claim 1 including the step of supporting the biological growth by means of a thermoplastic resinous filament.

4. The method of claim 1 wherein said filamentary bacterial growths are maintained in closely spaced proximity to each other.

5. The method of claim 3 wherein said filament is a copolymer of vinyl chloride and vinylidene chloride.

References Cited by the Examiner

UNITED STATES PATENTS

| 278,986 | 6/1883 | Luck | 261—111 |
|---|---|---|---|
| 3,112,261 | 11/1963 | Porter et al. | 210—17 |
| 3,113,102 | 12/1963 | Schulze | 210—150 |

FOREIGN PATENTS

| 418,272 | 9/1910 | France. |
|---|---|---|
| 25,993 | of 1901 | Great Britain. |
| 104,163 | 10/1917 | Great Britain. |
| 357,712 | 10/1931 | Great Britain. |

OTHER REFERENCES

Egan et al.: Evaluation of Plastic Trickling Filter Media, Industrial Wastes, vol. 5, No. 4, August 1960, pp. 71–77.

Schulze I, Experimental Vertical Screen Trickling Filter, Sewage and Industrial Wastes, vol. 29, No. 4, April 1957, pp. 458–467.

MORRIS O. WOLK, *Primary Examiner.*